United States Patent
Ircha

[19]

[11] Patent Number: 6,097,591
[45] Date of Patent: Aug. 1, 2000

[54] COMPUTER CASE WITH SWING-OUT MOTHERBOARD/BACKPLANE SUPPORT

[75] Inventor: Vladislav Ircha, Richmond, Canada

[73] Assignee: Seanix Technology (Canada) Inc., British Columbia, Canada

[21] Appl. No.: 08/697,554

[22] Filed: Aug. 27, 1996

[51] Int. Cl.[7] ................................. G06F 1/16; H05K 7/16
[52] U.S. Cl. .......................... 361/683; 361/725; 361/755; 361/796; 312/223.2
[58] Field of Search ...................... 312/223.2; 364/708.1; 361/683, 684, 725–727, 755, 788, 796, 797

[56] References Cited

U.S. PATENT DOCUMENTS

| | | |
|---|---|---|
| 4,356,531 | 10/1982 | Marino et al. . |
| 4,971,563 | 11/1990 | Wells, III . |
| 4,992,903 | 2/1991 | Chen . |
| 5,031,070 | 7/1991 | Hsu . |
| 5,121,296 | 6/1992 | Hsu . |
| 5,124,885 | 6/1992 | Liu . |
| 5,124,886 | 6/1992 | Golobay . |
| 5,136,468 | 8/1992 | Wong et al. . |
| 5,159,582 | 10/1992 | Murphy .................................. 361/683 |
| 5,164,886 | 11/1992 | Chang . |
| 5,209,356 | 5/1993 | Chaffee . |
| 5,227,954 | 7/1993 | Twigg . |
| 5,235,493 | 8/1993 | Yu . |
| 5,248,193 | 9/1993 | Schlemmer . |
| 5,262,923 | 11/1993 | Batta et al. . |
| 5,269,598 | 12/1993 | Liu . |
| 5,306,079 | 4/1994 | Liu . |
| 5,333,097 | 7/1994 | Christensen et al. . |
| 5,438,476 | 8/1995 | Steffes . |
| 5,466,059 | 11/1995 | Liu . |
| 5,513,068 | 4/1996 | Girard . |

FOREIGN PATENT DOCUMENTS

| | | |
|---|---|---|
| 154243 | 11/1993 | China . |
| 822206567 | 5/1992 | Taiwan . |

*Primary Examiner*—Michael W. Phillips
*Attorney, Agent, or Firm*—Smith Patent Office

[57] ABSTRACT

A computer case having a chassis, a motherboard support plate, a backplane having an edge attachable along an edge of the motherboard support plate to form a unitary motherboard-backplane support structure, and pivotable linkage members coupled between the chassis and the motherboard-backplane support structure for pivotal movement of the motherboard-backplane support structure between a first position in which the motherboard-backplane support structure is located inside the case and, a second position in which the motherboard-backplane support structure is located substantially outside the case.

5 Claims, 12 Drawing Sheets

COMPUTER CASE WITH SWING-OUT MOTHERBOARD/BACKPLANE SUPPORT

FIELD OF THE INVENTION

This application pertains to a personal computer case having a separable motherboard-backplane support structure which is swingably attached to the case. The motherboard-backplane support structure can be swung clear of the case for hardware debugging purposes without necessitating removal of add-on cards from the motherboard or backplane.

BACKGROUND OF THE INVENTION

Personal computers ("PCs") commonly comprise a sheet metal case containing a motherboard, one or more drive housings holding various drives, a backplane to which a motherboard and its add-on cards are attached, a power supply and various other components. To assemble a PC, the manufacturer determines which motherboard, add-on cards, drives, power supply, etc. are required. Those components are then fastened within the case, typically with screws.

During the PC manufacturing or servicing process it is necessary to test components and sub-assemblies at various stages. This is sometimes difficult, given the constraints imposed by prior art PC case designs. For example, the motherboard is typically screw-fastened to a base plate which is in turn fastened to the case. Add-on cards are plugged into edge connectors provided on the motherboard. The cards' external input-output connectors are aligned with and fastened adjacent apertures provided in a backplane structure in the rear wall of the case. Testing procedures sometimes require electrical probe or other access to specific points on the motherboard. However, access to such points can be obstructed by over-hanging portions of the power supply, drive housings, etc. This may necessitate laborious removal of add-on cards, disk drive and other peripheral connectors from the motherboard and/or removal of the motherboard itself. The removed components must then undergo complex reconfiguration and separate testing outside the case. Such testing is less desirable in comparison to testing conducted while the components remain in situ within the case and connected in the manner in which the PC is to be shipped to and used by the end user.

The present invention provides a computer case having an integrated motherboard-backplane support structure which can easily be swung between positions inside and outside the case without the need for removing add-on cards. The motherboard and all add-on cards can be left intact while the support structure is positioned outside the case. Further, most if not all of the cables connected between the motherboard and the add-on cards can be left intact. In most cases, only power supply or peripheral connector cables need to be disconnected to allow the motherboard-backplane support structure to swing outside the case. But, such cables can then be reconnected, returning the PC to fully operational status with the motherboard-backplane support structure outside the case. The invention thus affords much improved access to the motherboard, etc. for testing purposes without disrupting the PC's operating environment in which test procedures are most desirably performed.

Other features of the invention further enhance its attractiveness to PC manufacturers. For example, floppy and hard drive housings can be interconnected, allowing both floppy and hard drives to be removed as a single sub-assembly for testing purposes. The case is also easily convertible between desktop and tower configurations in a manner which allows location of the user control panel centrally on the front panel in the tower configuration, or at the top of the front panel in the desktop configuration.

SUMMARY OF THE INVENTION

In accordance with the preferred embodiment, the invention provides a computer case having a chassis, a motherboard support plate, and a backplane having an edge attachable along an edge of the motherboard support plate to form a unitary motherboard-backplane support structure. Pivotable linkage members coupled between the chassis and the support structure allow the support structure to pivot between a first position in which the support structure is located inside the case and, a second position substantially outside the case. The backplane can be disengaged and removed from the motherboard support plate when the support structure is disengaged and removed from the chassis.

A swing plate is fixed to the chassis, beneath the pivotable linkage members, to support and guide the motherboard-backplane support structure during movement thereof between the first and second positions aforesaid. The swing plate preferably has an arcuate guide channel. A tab on the backplane projects into and is guided along the channel as the support structure moves as aforesaid.

A 5¼" drive housing can be attached to the case in either one of two 90° opposed desktop or tower orientations of the housing. A 5¼" drive can be slidably inserted, in either one of two 180° opposed orientations, into each one of a plurality of channels provided in the housing. A control panel can be mounted within the housing either beneath the drive insertion channels when the housing is attached to the case in one of the 90° opposed orientations; or, above the drive insertion channels when the housing is attached to the case in the other one of the 90° opposed orientations.

A 3½" external drive housing can be removably mounted within the case. A 3½" internal drive housing can be removably attached to the 3½" external drive housing to form a sub-assembly which can be prepared in advance (including insertion of disk drives within the housings) for subsequent attachment to the case.

DETAILED DESCRIPTION OF THE PREFERRED EMBODIMENT

Figure 1:
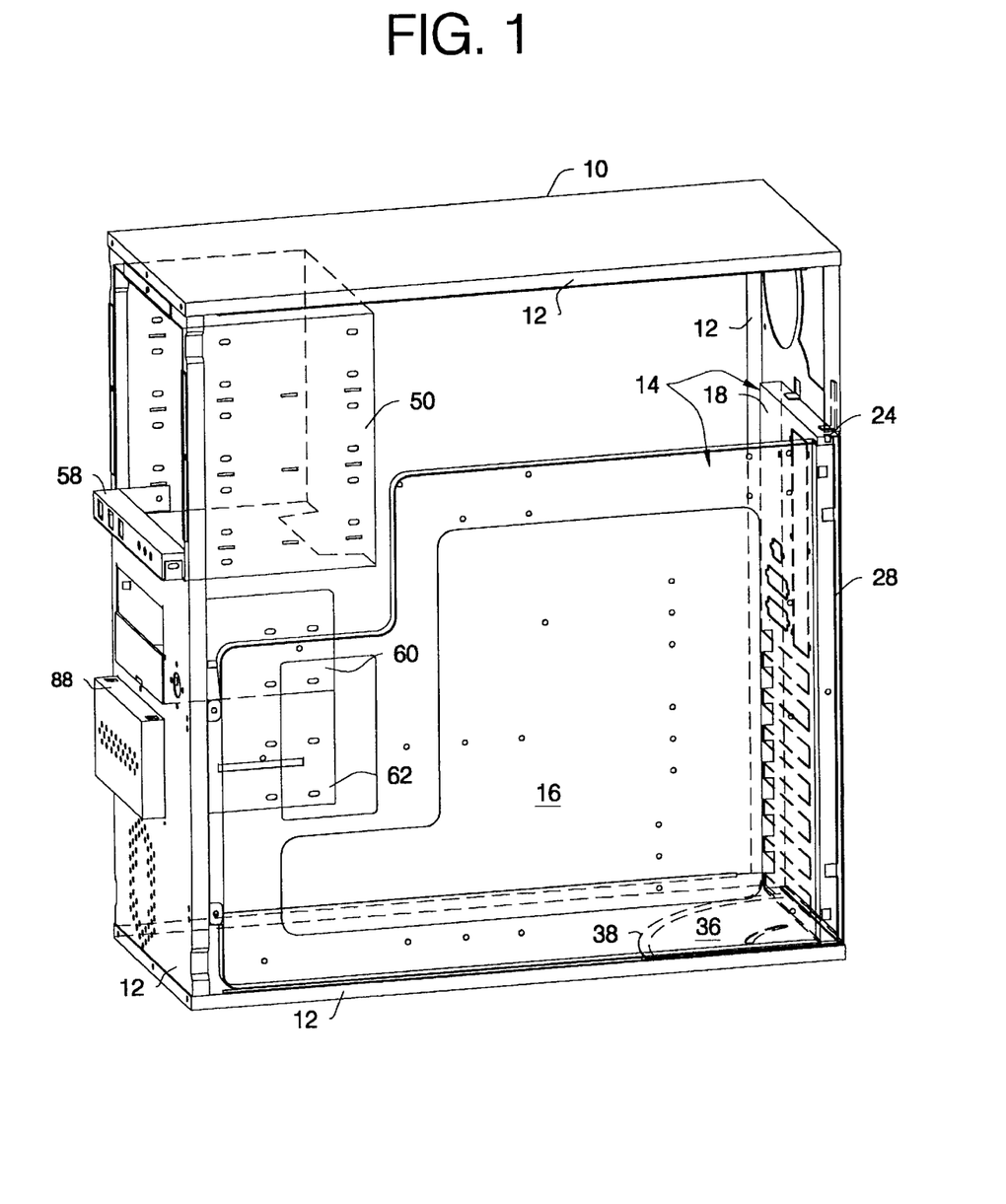
FIG. 1 is a front and side oblique perspective view of a computer case (in the tower configuration) according to the invention, and shows a motherboard-backplane support structure positioned inside the case.
Figure 2A:
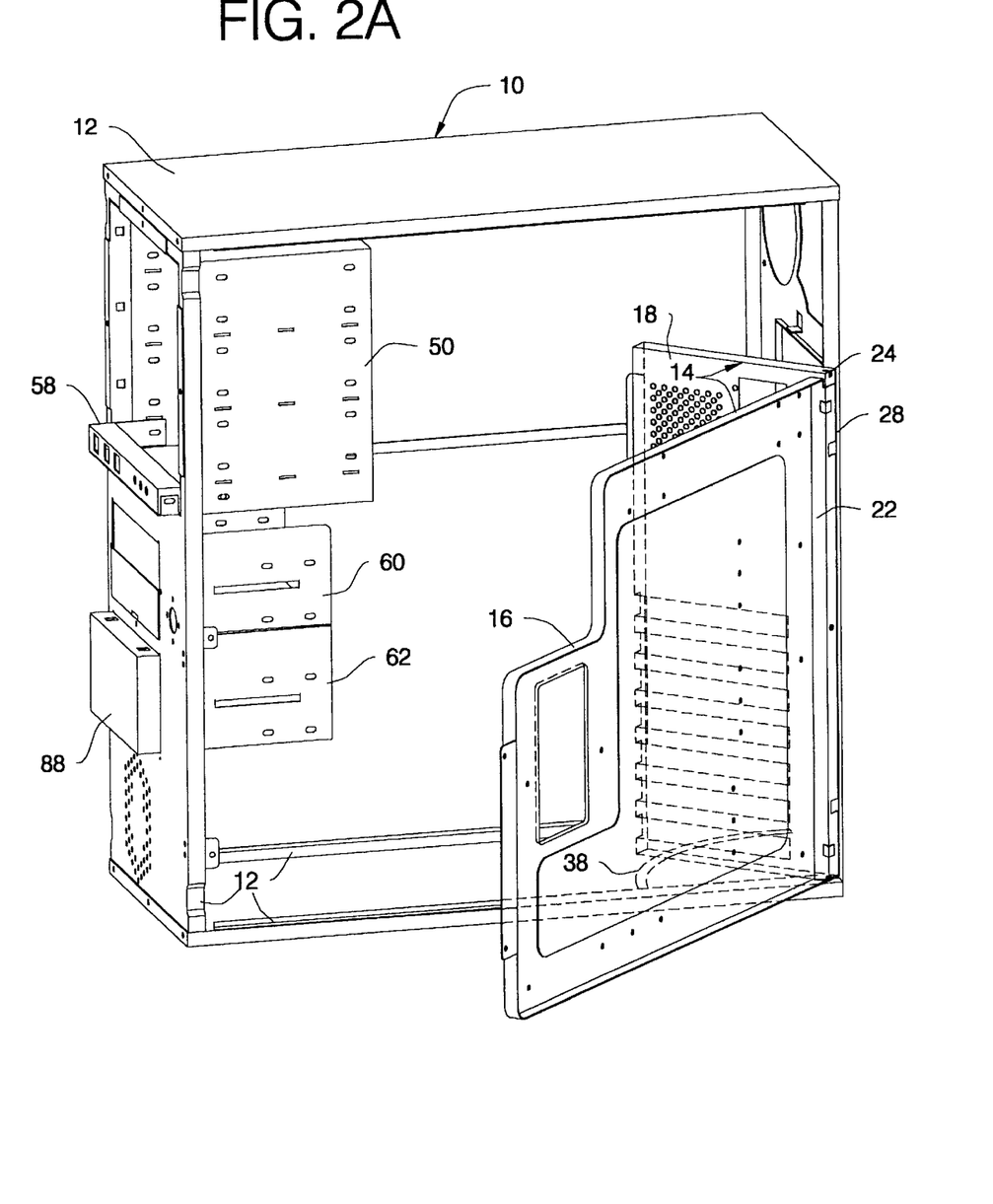
FIG. 2A is similar to FIG. 1, but shows the motherboard-backplane support structure partially swung outside the case.
Figure 2B:
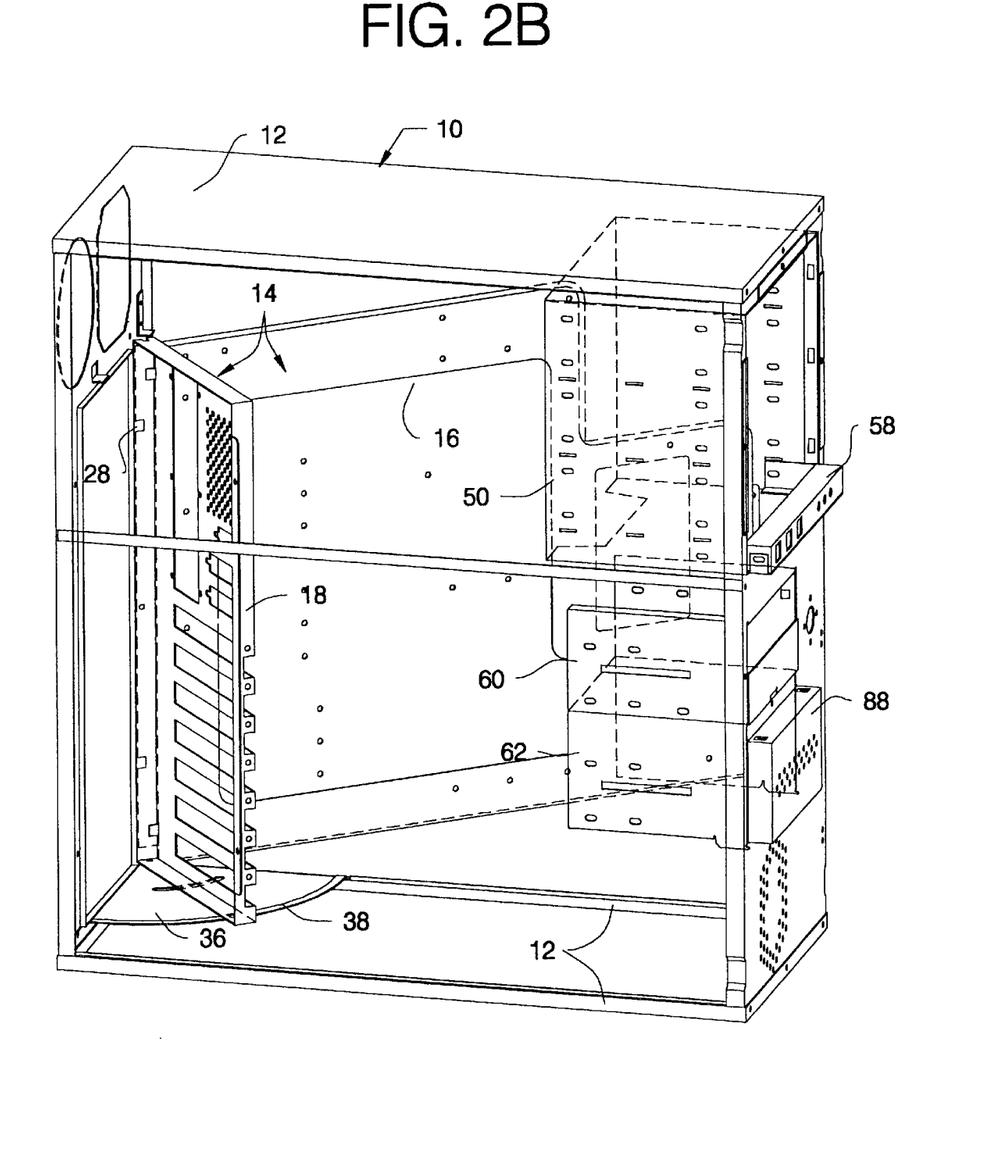
FIG. 2B is a rear perspective view showing the FIG. 2A structure from the opposite side.

FIGS. 1, 2A and 2B depict a computer case 10 having an integral chassis 12 made up of interconnected metal frame members. A motherboard-backplane support structure 14 consisting of motherboard support plate 16 and backplane 18 is pivotally connected to chassis 12 as hereinafter explained. A motherboard (not shown) can be mounted on motherboard support plane 14 in conventional fashion. Edge 22 (FIG. 2A) of backplane 18 is removably attached (by means of screws or other releasable fasteners) along a corresponding edge of motherboard support plate 16 so that motherboard support plate 16 and backplane 18 together form unitary motherboard-backplane support structure 14. Motherboard support plate 16 can be disconnected and removed from backplane 18 either while motherboard-backplane support structure 14 is completely removed from case 10 (FIG. 3A), or while backplane 18 remains connected to case 10 (FIG. 3B).

Pivotable linkage members are provided for pivotal connection of motherboard-backplane support structure 14 to chassis 12. More particularly, longitudinally aligned first and second pins 24, 26 (FIG. 3B) are respectively fixed near opposed ends of an outward edge 28 of chassis 12. Corresponding cutouts 30, 32 are provided in opposed upper and lower ends of backplane 18, adjacent edge 22. (The terms "upper" and "lower" are relative to the orientation of backplane 18 as seen in FIGS. 1, 2A and 2B.)

Motherboard-backplane support structure 14 is coupled to chassis 12 by guiding cutout 30 upwardly over first pin 24 and then lowering structure 14 to position cutout 32 over second pin 26. At this point, motherboard-backplane support structure 14 is positioned completely outside case 10. Motherboard-backplane support structure 14 can then be pivotally swung (with the aid of guide channel 38 and tab 40 described below) about the axis defined by first and second pins 24, 26 to position motherboard-backplane support structure 14 in the intermediate position shown in FIGS. 2A, 2B, and further pivoted to position structure 14 wholly inside case 10, as seen in FIG. 1. Suitable fasteners are used to retain structure 14 in the latter position for shipment to an end user.

Figure 3A:
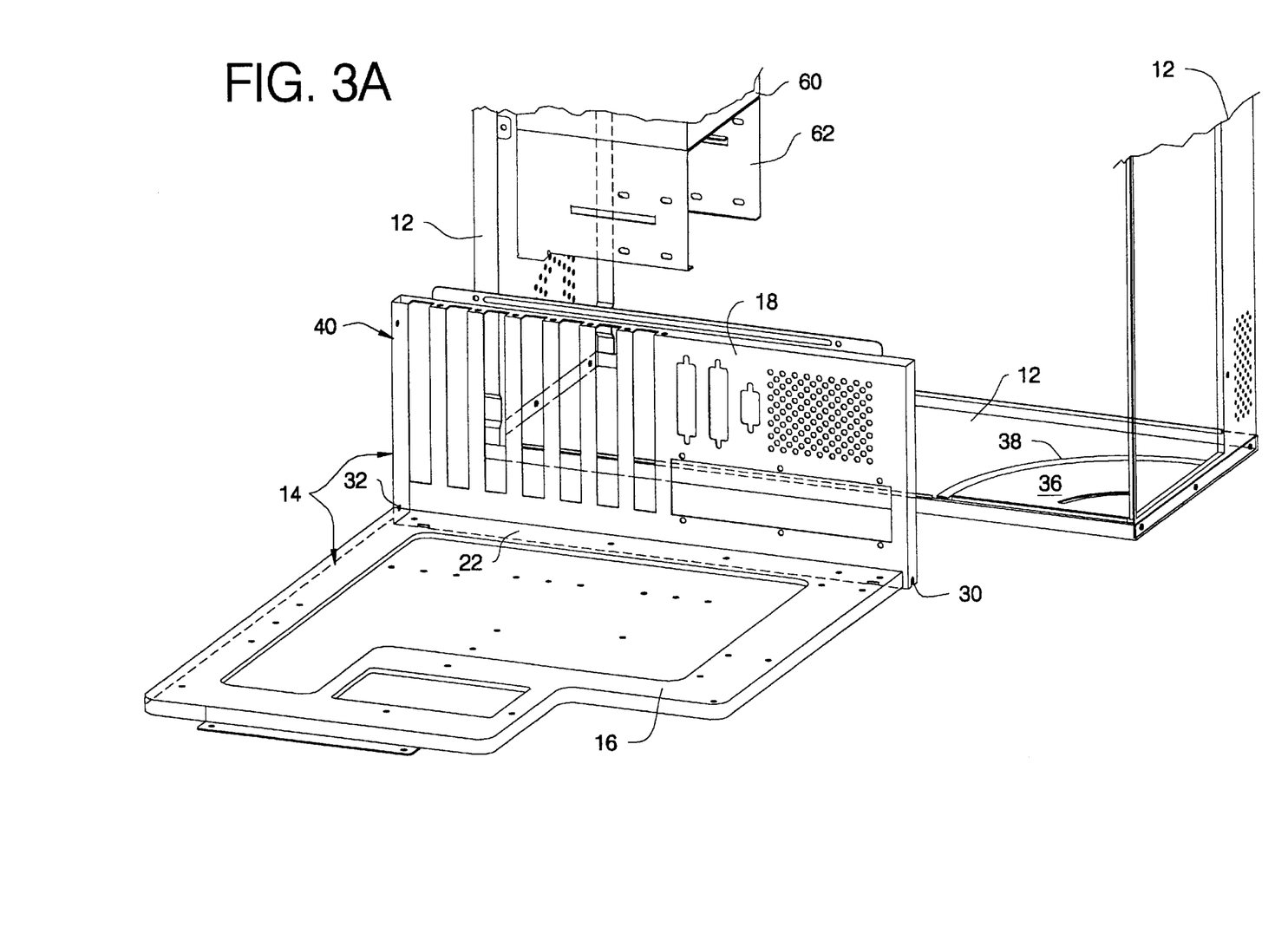
FIG. 3A is an oblique perspective view showing a portion of the computer case, with the motherboard-backplane support structure completely removed from the case.
Figure 3B:
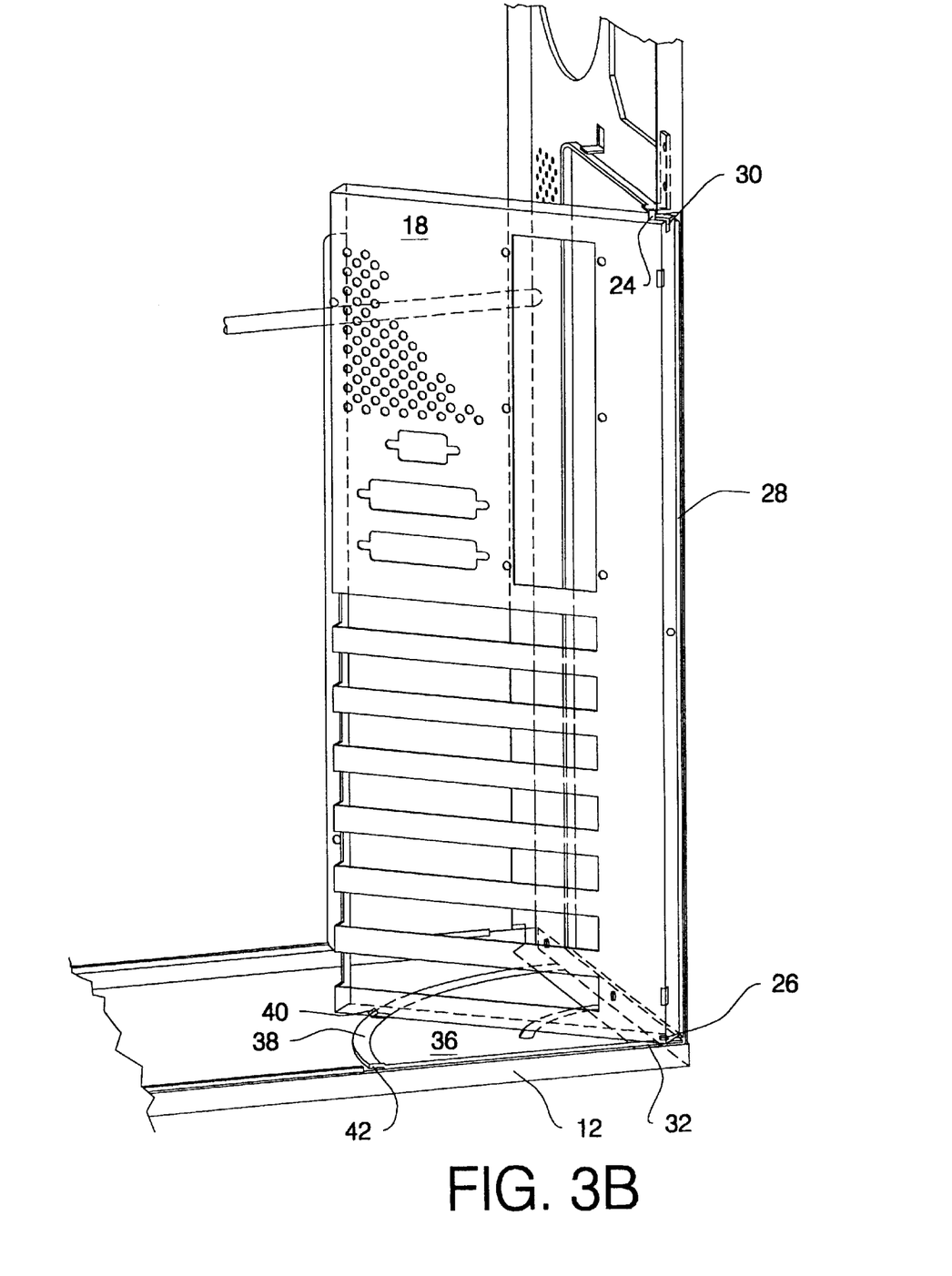
FIG. 3B is an enlarged, fragmented illustration depicting connection of the backplane to the computer case chassis, the motherboard having been disconnected from the backplane in this view.
Figure 3C:
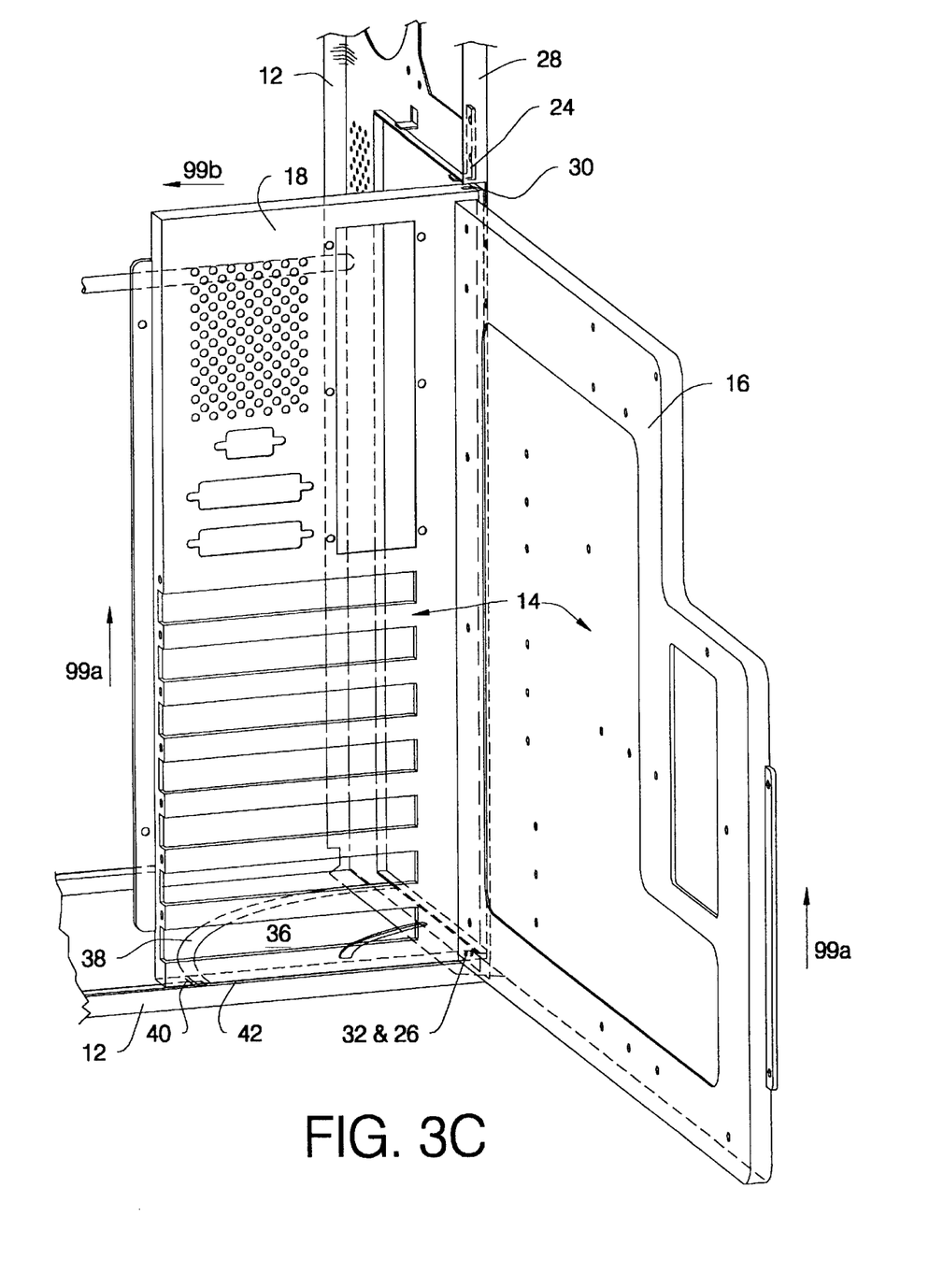
FIG. 3C shows the motherboard-backplane support structure being disconnected and removed from the case.

As best seen in FIGS. 3A and 3B, a swing plate 36 is fixed to chassis 12, beneath the aligned pins 24, 26 defining the longitudinal axis about which motherboard-backplane support structure 14 moves. Swing plate 36 supports and guides motherboard-backplane support structure 14 during movement thereof as aforesaid. An arcuate guide channel 38 is provided in swing plate 36, away from the pivot axis defined by pins 24, 26. A downwardly projecting tab 40 is provided on the lower, outward end of backplane 18. When motherboard-backplane support structure 14 is pivotally connected to chassis 12 and positioned either partially or wholly within case 10 (i.e. as seen in FIGS. 1, 2A and 2B), tab 40 projects into and moves within guide channel 38 during movement of motherboard-backplane support structure 14 between the positions aforesaid. By bearing against the edge of swing plate 36 defined by guide channel 38, tab 40 prevents unintended disengagement of motherboard-backplane support structure 14 from chassis 12. However, if motherboard-backplane support structure 14 is further pivoted to position structure 14 completely outside case 10, tab 40 passes beyond outward end 42 of guide channel 38 and no longer bears against swing plate 36, thus permitting disengagement and removal of structure 14 from chassis 12. Such disengagement and removal is accomplished by lifting structure 14 in the direction of arrow 99a (FIG. 3C) to disconnect pin 26 from aperture 32, followed by withdrawal of cutout 30 from pin 24 in the direction of arrow 99b.

Figure 4A:
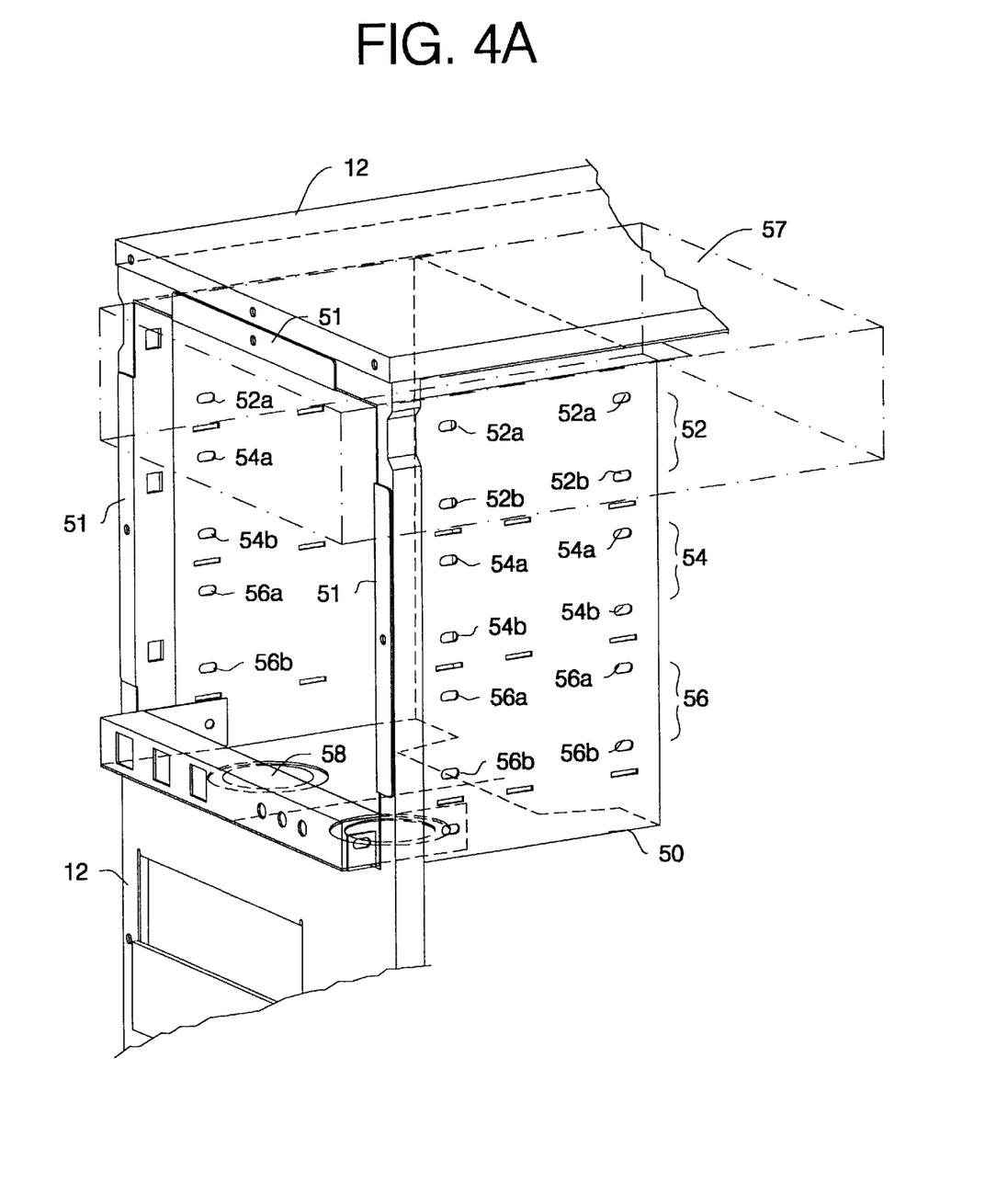
FIG. 4A is a front and right side isometric view of a 5¼" drive housing and control panel positioned for tower configuration of the computer case.
Figure 4B:
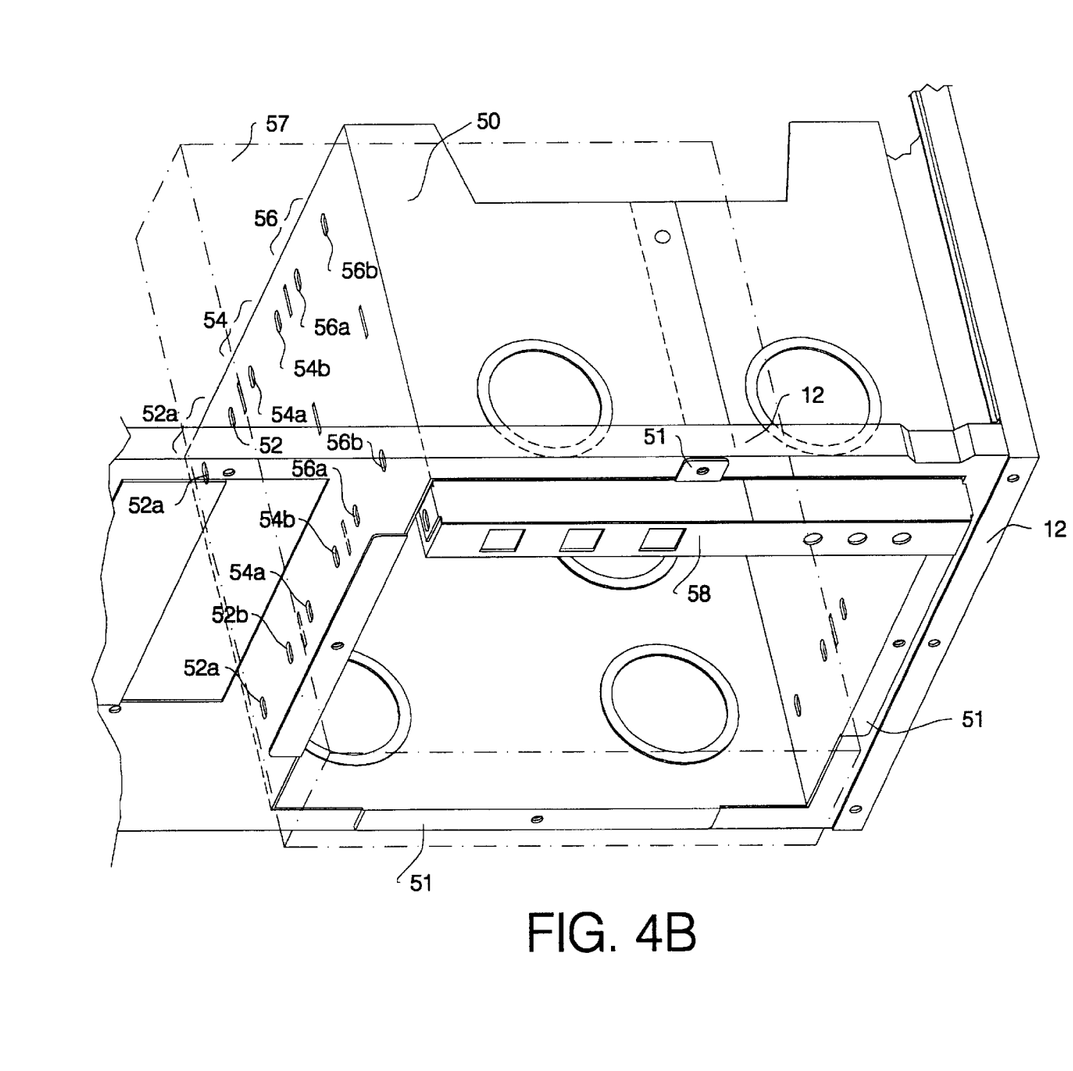
FIGS. 4B is a top, front, left side isometric view of the 5¼" drive housing and control panel positioned for desktop configuration of the computer case.

FIGS. 1, 2A and 2B also depict a 5¼" drive housing 50, which is separately illustrated in FIGS. 4A and 4B. FIG. 4A depicts 5¼" drive housing 50 and a control panel 58 (containing the usual user-activatable switches, indicator lights, etc.) oriented for adapting computer case 10 to the "tower" configuration. FIG. 4B shows housing 50 and control panel 58 oriented to adapt case 10 to the "desktop" configuration. Note that, when adapted for desktop configuration of case 10, housing 50 is rotated clockwise 90° and control panel 58 is rotated 180° with respect to their positions when adapted for tower configuration of case 10. Housing 50 is fixed, in the desired orientation, to case 10 by passing suitable fasteners through apertures in flanges 51 into corresponding fastener-receiving apertures in case 10.

Housing 50 has three channels 52, 54 and 56. A 5¼" drive 57 may be slidably inserted within each channel. If housing 50 is positioned for tower configuration of case 10 with control panel 58 positioned as depicted in FIG. 4A, then the drives are held in place by passing suitable fasteners through longitudinally opposed pairs of apertures 52b, 54b or 56b in the housing sidewall portions which define the respective drive insertion channels 52, 54 and 56. Alternatively, if housing 50 is rotated 90° into position for desktop configuration of case 10 with control panel 58 positioned as depicted in FIG. 4B, then the drives are rotated 180° with respect to their mounting orientation in the tower configuration and held in place by passing the fasteners through longitudinally opposed pairs of apertures 52a, 54a or 56a in the housing sidewall portions defining channels 52, 54 and 56.

To reduce the size of case 10, it is desirable to locate control panel 58 beneath drive insertion channels 52, 54, 56 when housing 50 is oriented for tower configuration of case 10, but to locate control panel 58 above the drive insertion channels if housing 50 is oriented for desktop configuration of case 10. This is to locate control panel 58 in the most convenient position for user access, irrespective of whether case 10 is in the tower or desktop configuration. Such alternative positioning of control panel 58 was not possible with prior art structures but is accomplished by the present invention.

Figure 5A:
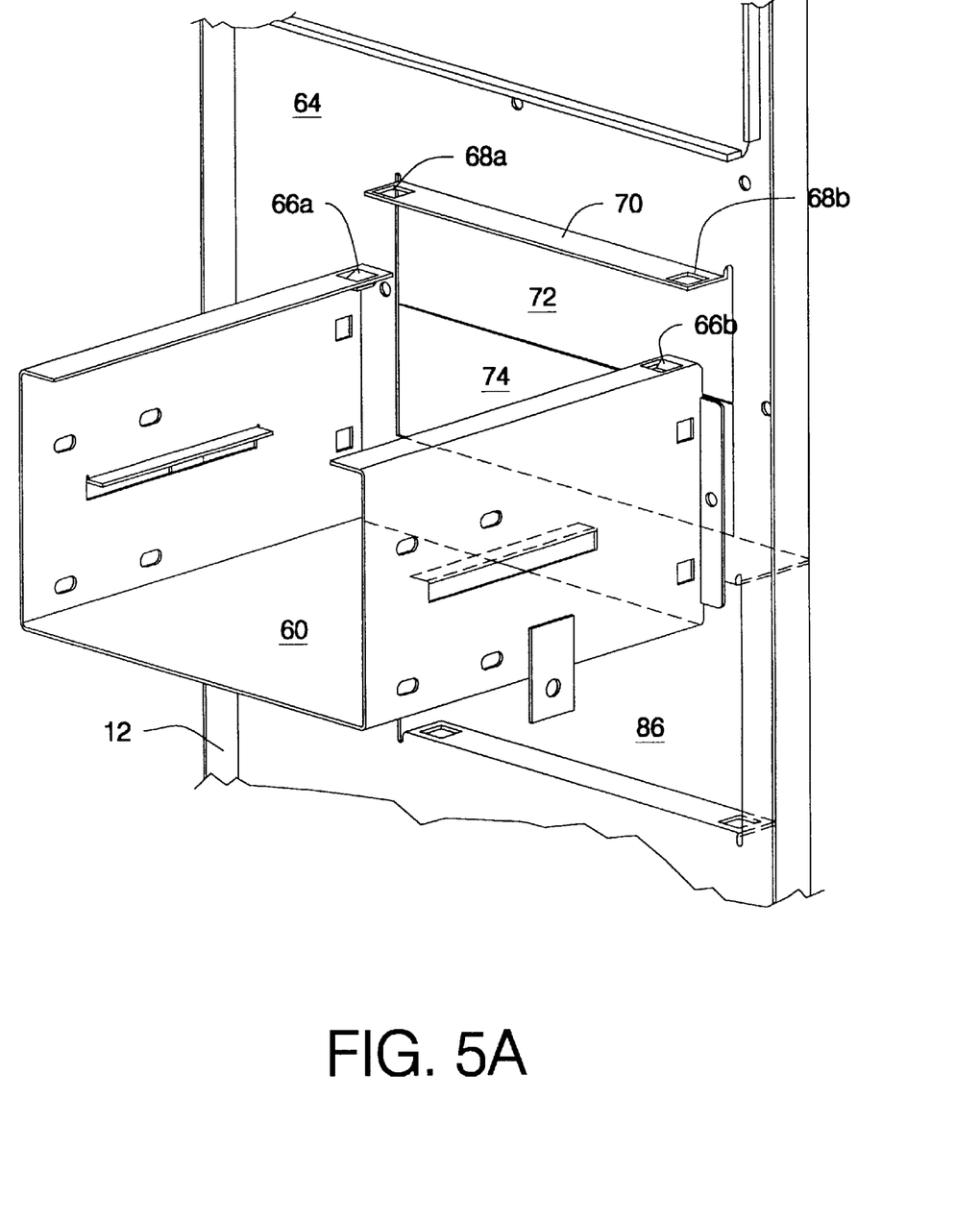
FIG. 5A is an oblique view, in perspective, of a portion of the rear side of the front wall of the computer case, showing a housing for an external 3½" drive positioned for attachment to the front wall.

FIGS. 1, 2A and 2B also depict a housing 60 for 3½" external drives and a housing 62 for 3½" internal drives. Housings 60, 62 are separately depicted in FIGS. 5A through 7. As best seen in FIG. 5A, housing 60 is removably attached to the inside front wall 64 of case 10 by positioning tab protrusions 66a, 66b above corresponding mating apertures 68a, 68b in flange 70 which is formed integrally with case 10. Tabs 66a, 66b are then pressed downwardly within apertures 68a, 68b respectively and housing 60 is drawn rearwardly away from flange 70 to interlockably engage housing 60 with case 10. One or two external 3½" drives (not shown) may be slidably inserted within housing 60 in conventional fashion for insertion of diskettes into the drives through apertures exposed by removal of cover plates 72 and/or 74.

Figure 5B:
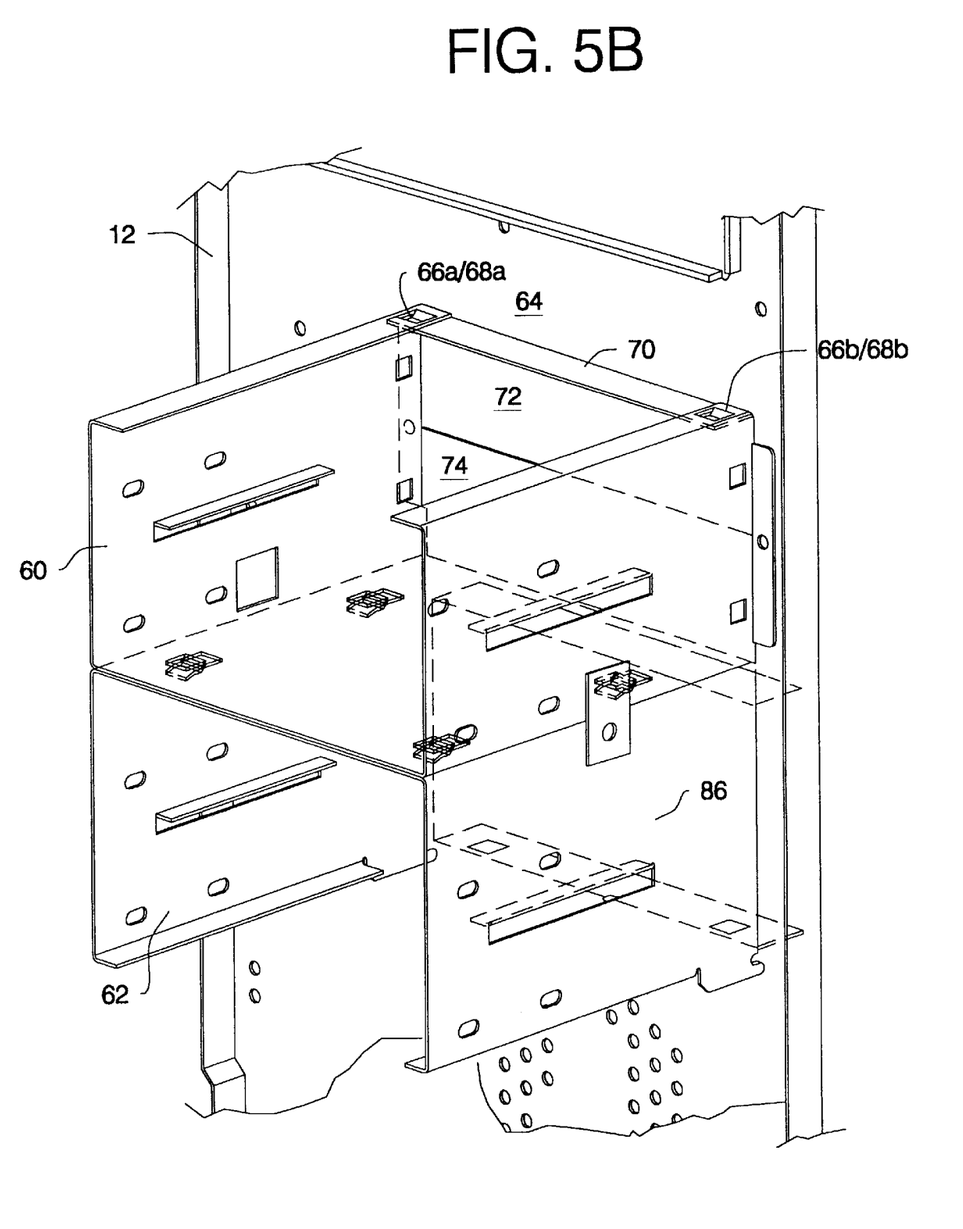
FIG. 5B is an oblique rear view, in perspective, showing a sub-assembly of two housings for internal and external 3½" drives respectively, detachably connected to the front wall.
Figure 6:
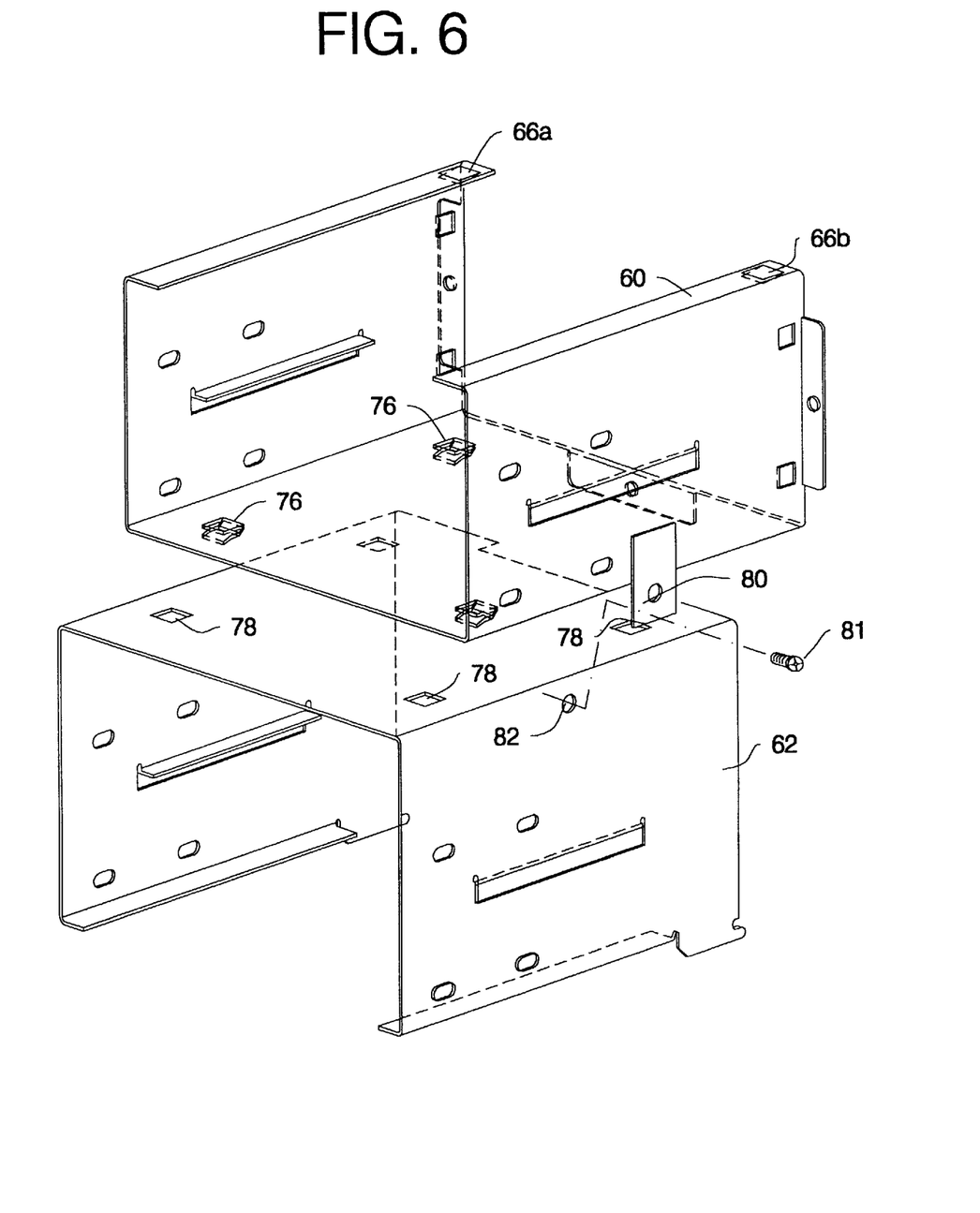
FIG. 6 is an oblique rear view, in perspective, of two housings for internal and external 3½" drives respectively, positioned for sub-assembly interconnection.

As best seen in FIGS. 5B and 6, drive housings 60, 62 may be interlockably engaged with one another to form a single sub-assembly which can be prepared in advance (including insertion of disk drives within the housings) for subsequent attachment to case 10. Conversely, the sub-assembly consisting of housings 60, 62 and drives contained therein can easily be removed from case 10 as a single unit. This is facilitated by interlockable engagement of housings 60, 62 via tab protrusions 76 in the base of housing 60. Corresponding apertures 78 are provided in the upper surface of housing 62. Tabs 76 are aligned over and inserted downwardly into apertures 78. Housing 60 is then pressed forwardly, while housing 62 is pressed rearwardly to interlockably engage tabs 76 against the underside of the upper surface of housing 62. With housings 60, 62 interlockably engaged as aforesaid flange 80 on housing 60 overlaps a portion of housing 62. A single screw 81 may be passed through an aperture in flange 80 and fastened through corresponding aperture 82 in housing 62 to prevent unintended separation of housings 60, 62 but permitting the housings to be separated by the simple act of removing the one screw.

Figure 7:
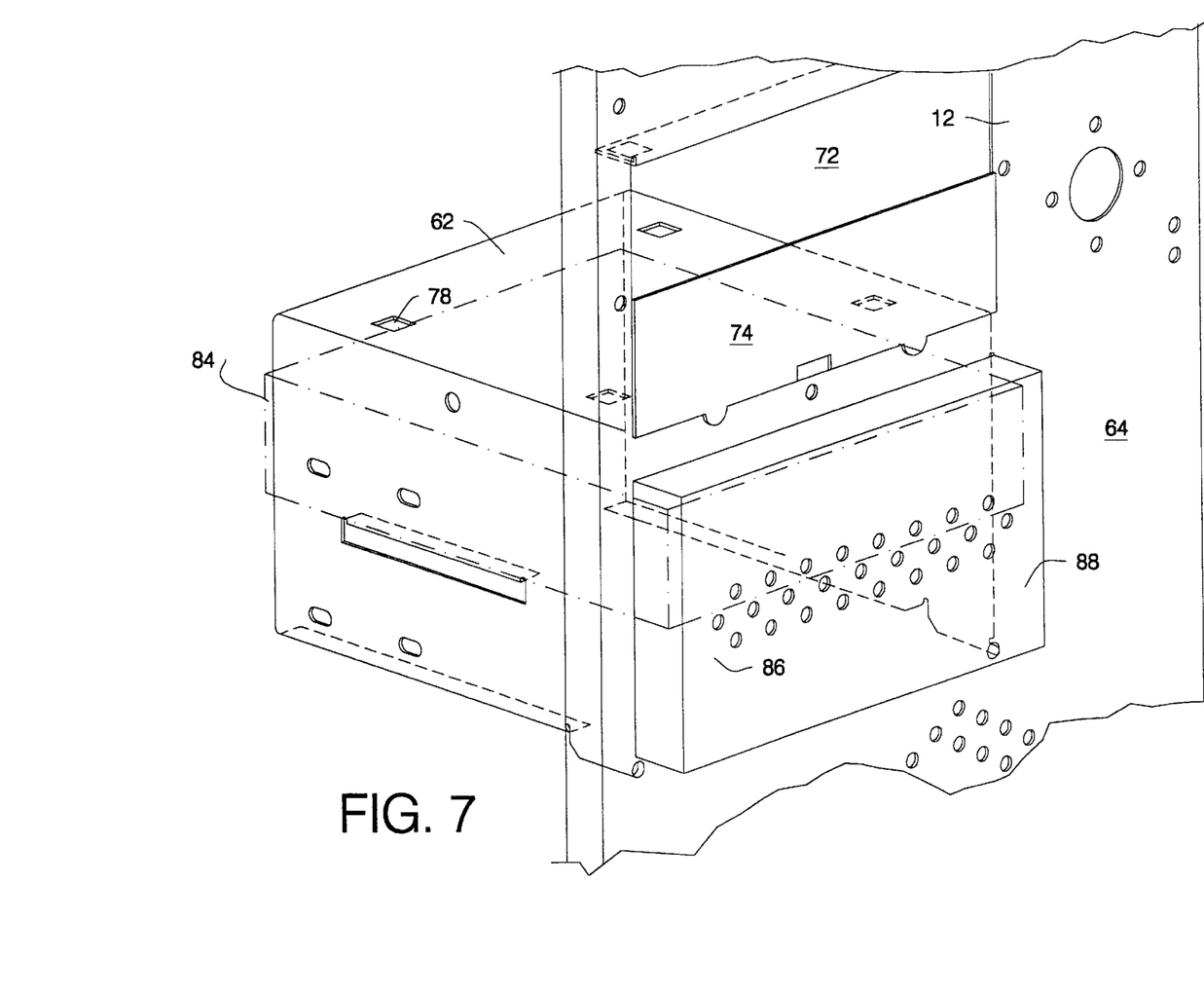
FIG. 7 is an oblique front view, in perspective, of a portion of the front side of the front wall of the computer case, showing the 3½" internal drive housing of FIG. 5B connected to the front wall and showing the forward portion of a 3½" internal drive within the housing protruding into a region enclosed by a metallic shield.

As shown in FIG. 7, an internal drive 84 mounted in housing 62 projects forwardly through an aperture 86 in case front wall 64. A metallic enclosure or shield 88 is fixed to case front wall 64 over aperture 86 in compliance with regulations governing emission of electromagnetic radiation by drive 84, flammability, etc.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A computer case, comprising:
   a. a chassis;
   b. a motherboard support plate;
   c. a backplane having an edge attachable along an edge of said motherboard support plate to form a unitary motherboard-backplane support structure;
   d. pivotable linkage members coupled between said chassis and said motherboard-backplane support structure for pivotal movement of said motherboard-backplane support structure between:
      i. a first position in which said motherboard-backplane support structure is located inside said case; and,
      ii. a second position in which said motherboard-backplane support structure is located substantially outside said case.

2. A computer case as defined in claim 1, wherein said pivotable linkage members further comprise:
   a. longitudinally aligned first and second pins respectively fixed near opposed ends of one outward edge of said chassis;
   b. a first aperture in one end of said backplane, said first aperture for receiving said first pin; and,
   c. a second aperture in an opposed end of said backplane, said second aperture for receiving said second pin.

3. A computer case as defined in claim 1, wherein said backplane is disengageable and removable from said motherboard support plate when said motherboard-backplane support structure is disengaged and removed from said chassis.

4. A computer case as defined in claim 1, further comprising a swing plate fixed to said chassis beneath said pivotable linkage members, said swing plate for supporting and guiding said motherboard-backplane support structure during movement thereof between said first and second positions.

5. A computer case as defined in claim 4, wherein:
   a. said swing plate further comprises an arcuate guide channel; and,
   b. said backplane further comprises a tab member for projecting into and moving within said guide channel during said movement of said motherboard-backplane support structure between said first and second positions;

said tab member further preventing disengagement of said motherboard-backplane support structure from said chassis during said movement of said motherboard-backplane support structure between said first and second positions, but permitting such disengagement after passage of said tab member beyond an outward end of said guide channel.

* * * * *